United States Patent
Bostick et al.

(10) Patent No.: US 11,042,808 B2
(45) Date of Patent: Jun. 22, 2021

(54) PREDICTING ACTIVITY CONSEQUENCES BASED ON COGNITIVE MODELING

(71) Applicant: International Business Machines Corporation, Armonk, NY (US)

(72) Inventors: James E. Bostick, Cedar Park, TX (US); Danny Yen-Fu Chen, Austin, TX (US); Sarbajit K. Rakshit, Kolkata (IN); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 16/008,890

(22) Filed: Jun. 14, 2018

(65) Prior Publication Data
US 2019/0385074 A1 Dec. 19, 2019

(51) Int. Cl.
*G06N 5/04* (2006.01)
*G06F 40/40* (2020.01)
*H04L 12/40* (2006.01)

(52) U.S. Cl.
CPC ............ *G06N 5/048* (2013.01); *G06F 40/40* (2020.01); *H04L 12/40* (2013.01)

(58) Field of Classification Search
USPC .......................................................... 706/52
See application file for complete search history.

(56) References Cited

U.S. PATENT DOCUMENTS

| 10,766,483 | B2 * | 9/2020 | Marzorati | ............... B60N 2/24 |
| 10,812,855 | B2 * | 10/2020 | Kwatra | .................. G06N 5/041 |
| 10,832,419 | B2 * | 11/2020 | Bharti | ................... G06K 9/6228 |
| 10,841,663 | B2 * | 11/2020 | Kwatra | ............ H04N 21/41407 |
| 10,916,245 | B2 * | 2/2021 | Kwatra | ............... G10L 15/22 |
| 2010/0205131 | A1 | 8/2010 | Kumar et al. | |
| 2012/0059771 | A1 | 3/2012 | Von Groll et al. | |
| 2014/0278306 | A1 | 9/2014 | Taghavi et al. | |

* cited by examiner

*Primary Examiner* — Michael B Holmes
(74) *Attorney, Agent, or Firm* — Yee & Associates, P.C.

(57) ABSTRACT

Predicting probable activity consequences is provided. Information is collected from data sources to identify various activities. Patterns of how any identified activity is linked with a corresponding event are detected based on analyzing the information. The patterns are indexed with data having a relationship to a particular event. Activity context information associated with a set of identified activities corresponding to the particular event is extracted from the information. A cognitive model of how the set of identified activities corresponding to the particular event are related to a set of activity consequences is generated. Probable activity consequences with degree of severity corresponding to the activity context information is predicted based on the cognitive model. A recommendation to perform a set of action steps to reduce impact of the probable activity consequences on different aspects of the activity context information associated with the set of identified activities is generated.

20 Claims, 3 Drawing Sheets

PREDICTING ACTIVITY CONSEQUENCES BASED ON COGNITIVE MODELING

BACKGROUND

1. Field

The disclosure relates generally to cognitive modeling and more specifically to predicting probable consequences of one or more activities corresponding to an event based on cognitive modeling and generating action step recommendations to eliminate or reduce impact of the probable consequences of the one or more activities.

2. Description of the Related Art

Cognitive modeling is an approximation of cognitive processes for comprehension and prediction. In other words, cognitive modeling is an area of computer science that deals with simulating human problem solving and mental task processes in a computerized model. Such a computerized cognitive model can be used to simulate or predict behavior or performance of activities similar to the ones modeled. Cognitive modeling is used in many artificial intelligence applications, such as natural language programming, expert systems, and neural networks, as well as in robotics and virtual reality applications. Cognitive models are also used to improve products in manufacturing segments such as human factors engineering, and computer game and user interface design. Cognitive models tend to be focused on a single cognitive phenomenon or process (e.g., list learning), how two or more processes interact (e.g., visual search and decision making), or to make predictions for a specific activity or event (e.g., how developing and presenting a new software product will affect sales and future revenue streams for a company).

SUMMARY

According to one illustrative embodiment, a computer-implemented method for predicting probable activity consequences is provided. A computer collects information from a plurality of data sources to identify various activities. The computer detects patterns of how any identified activity is linked with a corresponding event based on analyzing the collected information. The computer indexes the patterns with data having a detected relationship to a particular event. The computer extracts activity context information associated with a set of one or more identified activities corresponding to the particular event from the collected information. The computer generates a cognitive model of how the set of one or more identified activities corresponding to the particular event are related to a set of activity consequences. The computer predicts one or more probable activity consequences with degree of severity corresponding to the activity context information based on the generated cognitive model. The computer generates a recommendation to perform a set of one or more action steps to reduce impact of the probable activity consequences on one or more different aspects of the activity context information associated with the set of identified activities. According to other illustrative embodiments, a computer system and computer program product for predicting probable activity consequences are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
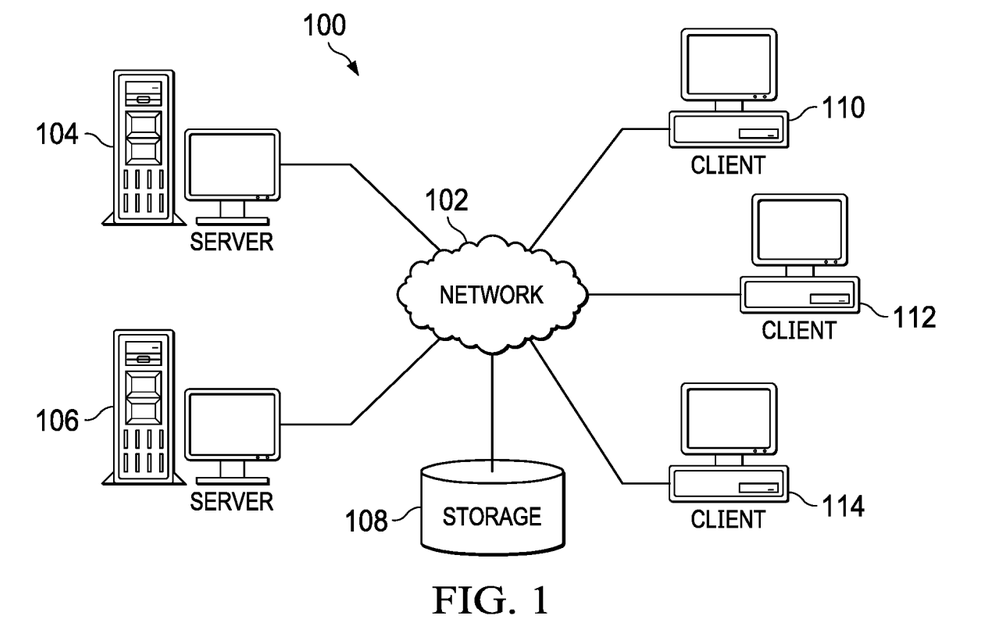
FIG. 1 is a pictorial representation of a network of data processing systems in which illustrative embodiments may be implemented.
Figure 2:
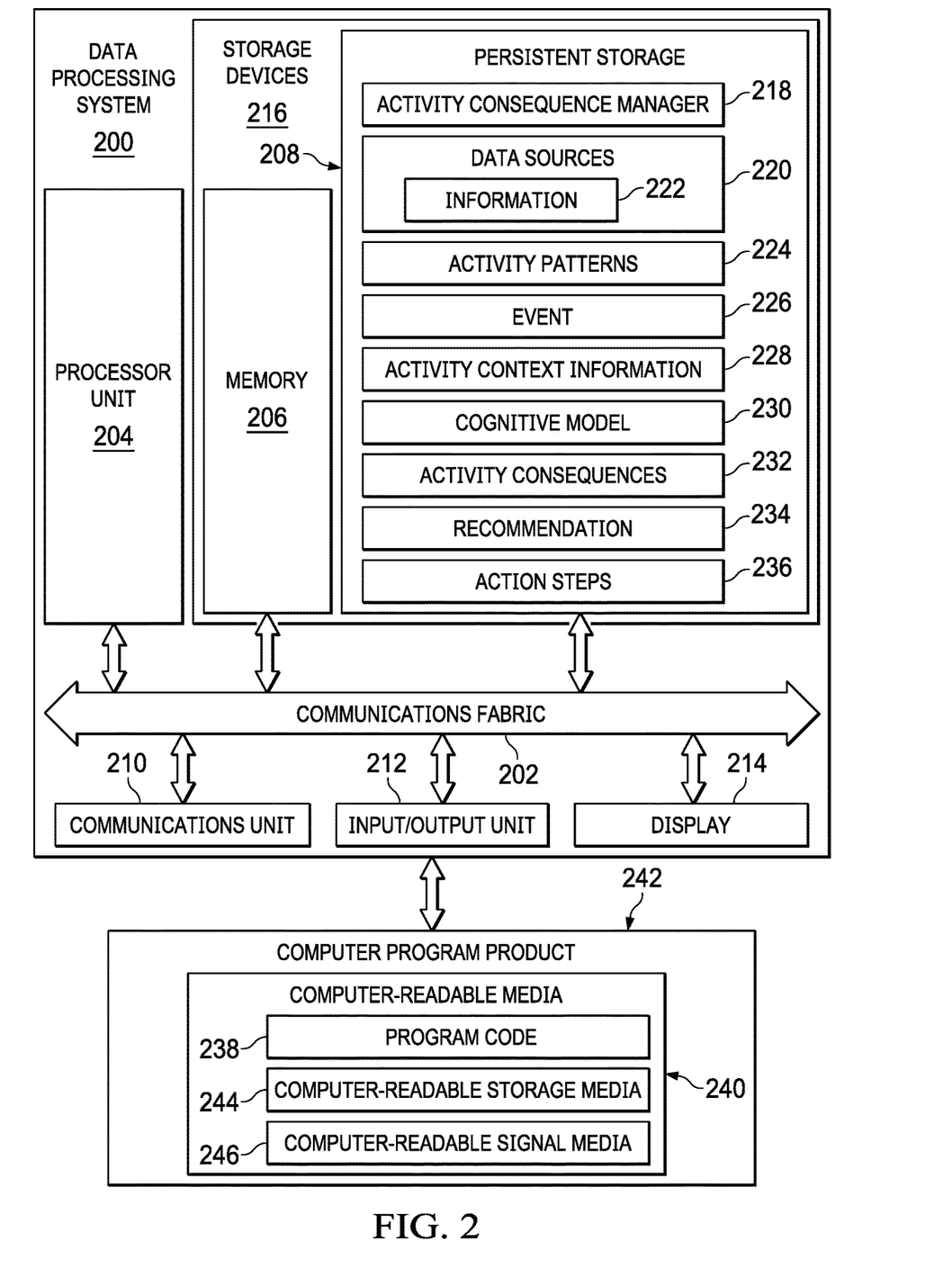
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 and server 106 may provide a set of activity consequence prediction services. For example, server 104 and server 106 may automatically predict probable consequences of activities corresponding to an event based on cognitive modeling and generate action step recommendations to eliminate or reduce impact of the probable consequences of the activities. Further, it should be noted that server 104 and server 106 may each represent a cluster of computers in a data center hosting a plurality of activity consequence prediction services. Alternatively, server 104 and server 106 may represent computer nodes in a cloud environment that provides activity consequence prediction services.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, and the like, with wire or wireless communication links to network 102. Users of clients 110, 112, and 114 may utilize clients 110, 112, and 114 to access the activity consequence prediction services provided by server 104 and server 106.

Storage 108 is a network storage device capable of storing any type of data in a structured format or an unstructured format. In addition, storage 108 may represent a plurality of network storage devices. Further, storage 108 may store, for example, identifiers for a plurality of different client devices and client device users; identifiers for a plurality of different data sources; lists of events corresponding to different client device users; activity information corresponding to listed events; detected activity patterns in the collected information; activity context information extracted from the collected information; and the like. Furthermore, storage unit 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as sever 104 in FIG. 1, in which computer readable program code or instructions implementing processes of illustrative embodiments may be located. Alternatively, data processing system 200 may be implemented in a robotic device. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores activity consequence manager 218. However, it should be noted that even though activity consequence manager 218 is illustrated as residing in persistent storage 208, in an alternative illustrative embodiment activity consequence manager 218 may be a separate component of data processing system 200. For example, activity consequence manager 218 may be a hardware component coupled to communication fabric 202 or a combination of hardware and software components.

Activity consequence manager 218 controls the process of predicting probable consequences of a set of one or more activities corresponding to a particular event based on cognitive modeling and generating a recommendation of one or more action steps to eliminate or reduce impact of the probable consequences of the set of activities. Activity consequence manager 218 utilizes data sources 220 to collect information 222. Data sources 220 represent a plurality of remote data sources, such as, for example, news sites, corporate sites, social media sites, emails, text messages, electronic calendars, and sensors. Data sources 220 contain information 222. Information 222 represents information that corresponds to a plurality of different activities. The activities may be any type of activities or tasks corresponding to various different events. Activity consequence manager 218 identifies the various activities in information 222.

Activity consequence manager 218 detects activity patterns 224 in information 222. Activity patterns 224 represent patterns of how any identified activity in information 222 is linked with a corresponding event. Activity consequence manager 218 detects activity patterns 224 based on analyzing information 222. Event 226 represents a particular event or set of two or more events corresponding to a particular client device, such as, for example, client 114 in FIG. 1. Activity consequence manager 218 indexes one or more activity patterns in activity patterns 224 to data having a detected relationship to event 226.

In addition, activity consequence manager 218 extracts activity context information 228 from information 222. Activity context information 228 represents context information that is associated with a set of activities corresponding to event 226. Activity context information 228 may include different aspects, such as, for example, activity involved parties, activity geographic location, activity location type, activity importance, activity timing, and the like.

Activity consequence manager 218 generates cognitive model 230 from information 222 using text mining and natural language processing, for example. Cognitive model 230 shows how the set of activities corresponding to event 226 are related to activity consequences 232. Activity consequences 232 represent probable activity consequences, along with degree of severity, which correspond to different aspects of activity context information 228. Activity consequence manager 218 predicts activity consequences 232 based on information in cognitive model 230.

Activity consequence manager 218 generates recommendation 234, which is a set of one or more action steps, such as action steps 236, to reduce impact of activity consequences 232 on the different aspects of activity context information 228. Further, activity consequence manager 218 automatically performs action steps 236 to reduce the impact of activity consequences 232. Alternatively, activity consequence manager 218 may automatically perform another activity corresponding to event 226 having a lowest degree of severity of probable consequences.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a microphone, a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Every activity influences downstream activities. In addition, some consequences of these activities have more impact than others. Consequences often depend on the type of activities, duration of the activities, importance of the activities, who is involved with the activities, where the activities are performed (e.g., location and type of location), and the like. While performing any activity, if downstream activities are not properly analyzed, then mistakes can be made. Illustrative embodiments utilize cognitive modeling to proactively analyze and assess probable consequences of activities with degree of severity and generate recommendations for action steps to eliminate or decrease impact of these probable consequences and/or increase system performance.

Illustrative embodiments utilize context information, such as, for example, involved party information, geographic location information, timing information, and the like, associated with activities to predict a set of one or more probable consequences with degree of severity corresponding to one or more different aspects of the context information. Illustrative embodiments implement cognitive modeling to identify areas impacted by the probable consequences and determine how an activity should be changed or should be avoided. Illustrative embodiments recommend various activity alternatives, such as, for example, changing activity involved parties, changing activity geographic location, changing activity location type, changing activity timing, and the like, which will eliminate or reduce impact of the probable consequences.

Illustrative embodiments collect information from a plurality of different data sources, such as, for example, news websites, corporate websites, social media websites, emails, text messages, electronic calendars, and various types of sensors, to identify various different activities. The various types of sensors may be, for example, biometric sensors to detect user mood or cognitive state, image capturing devices such as cameras, sound capturing devices such as microphones, weather sensors, temperature sensors, mechanical sensors, proximity sensors, infrared sensors, pressure sensors, ultrasonic sensors, radar sensors, vibration sensors, touch sensors, and the like. Illustrative embodiments analyze the collected information to detect patterns of how any identified activity in the various different activities is linked with a corresponding event. Illustrative embodiments index the patterns with data having a detected relationship to a particular event.

Illustrative embodiments extract activity context information associated with a set of one or more identified activities corresponding to the particular event from the collected information. The activity context information includes a plurality of different aspects, such as, for example, location, timing, and involved parties. The activity context information also may include type of location, such as, for example, a business environment, a shopping environment, an educational environment, recreational environment, a sporting environment, and the like. Timing may include, for example, business hours, non-business hours, week day, weekend, week, month, and year. Illustrative embodiments also may consider importance, significance, or impact of the activity as context information.

Using text mining and natural language processing, illustrative embodiments generate a cognitive model of how the set of one or more identified activities corresponding to the particular event are related to a set of activity consequences. Text mining is a process of deriving high-quality information from text. Typically, high-quality information is derived through developing patterns and trends via means, such as, for example, statistical pattern learning. Text mining usually involves the process of structuring the input text (e.g., through semantic parsing for key concepts, along with addition of some derived linguistic features and removal of others, and subsequent insertion into a database), deriving patterns within the structured data, and finally evaluation and interpretation of the output. "High quality" with regard to text mining refers to some combination of relevance, novelty, and interestingness. Standard text mining tasks include text categorization, text clustering, concept or entity extraction, production of granular taxonomies, sentiment analysis, document summarization, and entity relation modeling (i.e., learning relations between named entities or parties). Text analysis involves information retrieval and lexical analysis to study word frequency distributions, pattern recognition, tagging or annotation, information extractions, data mining techniques including link and association analysis, visualization, and predictive analytics. One goal is to turn text into data for analysis via artificial intelligence using natural language processing and analytical methods.

While a user is performing the particular activity, illustrative embodiments analyze a detected pattern of that particular activity and predict probable consequences with degree of severity corresponding to the different aspects of the activity context information based on analysis of the detected pattern. Illustrative embodiments also recommend a set of one or more action steps to eliminate or reduce impact of the probable consequences or recommend an alternate activity having a lowest degree of severity of probable consequences. Further, illustrative embodiments may automatically perform the set of action steps to eliminate or reduce the impact of the probable consequences or automatically perform the alternate activity having the lowest degree of severity of probable consequences.

As an example scenario, news sites release information regarding an event. Afterward, a company site releases a financial statement, which through text mining and analysis, shows a relationship to the prior released news information regarding the event, along with detected consequences, such as, for example, decline in profits and exposure to legal action. Therefore, illustrative embodiments monitor news stories with similar context to predict probable consequences and, should the news information regarding the event be something that the company can influence, illustrative embodiments may recommend how to conduct the event by, for example, changing the location, timing, and/or parties involved. For example, illustrative embodiments may recommend changing from a business team of the company to a legal team of the company to decrease probable consequences of legal action. In addition, by illustrative embodiments comparing consequences of similar news upon similar companies, illustrative embodiments may optimize the recommendation for those similar companies with regard to different sets of involved parties, locations, timings, and the like.

As another example scenario, a robotic system may implement illustrative embodiments to predict probable activity consequences and increase system performance. The robotic system may be, for example, a personal robot, an industrial robot, a military robot, a domestic robot, a stationary robot, a mobile robot, a wheeled robot, an aerial robot, an underwater robot, an autonomous robot, a semi-autonomous robot, and the like. Using illustrative embodiments, the robotic system collects information from a plurality of data sources including local and remote sensors, analyzes the collected information to detect patterns in the collected information corresponding to an activity of the robotic system, and predicts probable consequences of the activity with degree of severity based on the detected patterns. Further, the robotic system automatically performs a set of steps to eliminate or reduce impact of the probable consequences of the activity or performs an alternate activity having a lowest degree of severity of probable consequences. Thus, illustrative embodiments increase performance of the robotic system.

As a result, illustrative embodiments provide a technical effect of increased system performance by producing more favorable end-results, improved and faster outcomes, decreased output time, and reduced output processing cost. In addition, illustrative embodiments provide a technical solution to a technical problem by determining patterns in collected data to optimize current system activities and modify future system activities based on determined best outcomes.

Figure 3:
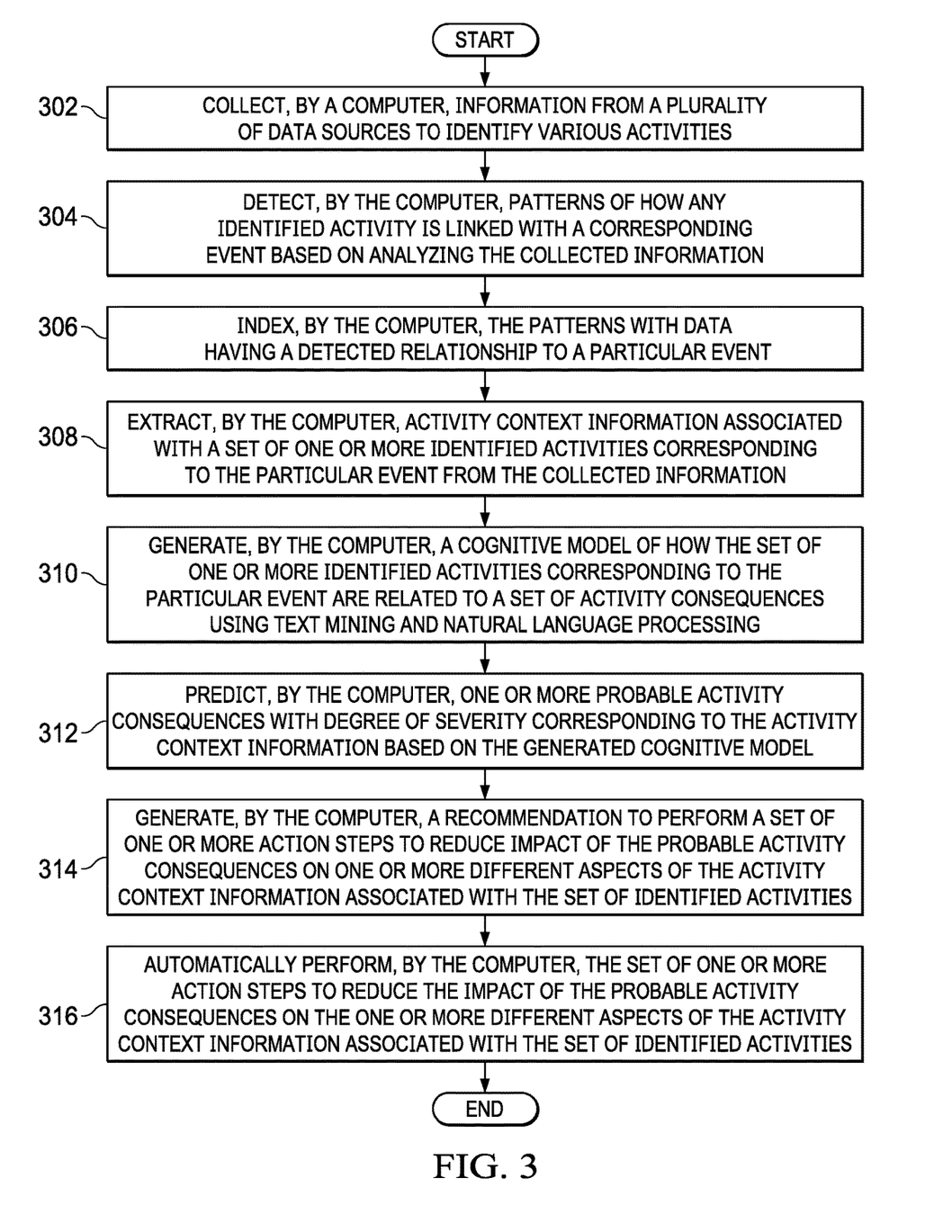
FIG. 3 is a flowchart illustrating a process for predicting probable activity consequences based on cognitive modeling in accordance with an illustrative embodiment.

With reference now to FIG. 3, a flowchart illustrating a process for predicting probable activity consequences based on cognitive modeling is shown in accordance with an illustrative embodiment. The process shown in FIG. 3 may be implemented in a computer, such as, for example, server 106 in FIG. 1 or data processing system 200 in FIG. 2.

The process begins when the computer collects information from a plurality of data sources to identify various activities (step 302). The computer may passively receive and/or actively retrieve the information from the plurality of data sources. The plurality of data sources may include, for example, one or more of news websites, corporate websites, social media websites, emails, text messages, electronic calendars, and various types of different sensors. The various activities may include any type of activity corresponding to any type of event or task.

In addition, the computer detects patterns of how any identified activity is linked with a corresponding event based on analyzing the collected information (step 304). The computer also indexes the patterns with data having a detected relationship to a particular event (step 306). Further, the computer extracts activity context information associated with a set of one or more identified activities corresponding to the particular event from the collected information (step 308).

Afterward, the computer generates a cognitive model of how the set of one or more identified activities corresponding to the particular event are related to a set of activity consequences (step 310). The computer may generate the cognitive model using text mining and natural language processing, for example. Furthermore, the computer predicts one or more probable activity consequences with degree of severity corresponding to the activity context information based on the generated cognitive model (step 312).

Moreover, the computer generates a recommendation to perform a set of one or more action steps to reduce impact of the probable activity consequences on one or more different aspects of the activity context information associated with the set of identified activities (step 314). Then, the computer automatically performs the set of one or more action steps to reduce the impact of the probable activity consequences on the one or more different aspects of the activity context information associated with the set of identified activities (step 316). Thereafter, the process terminates.

Thus, illustrative embodiments of the present invention provide a computer-implemented method, computer system, and computer program product for predicting probable consequences of one or more activities corresponding to an event based on cognitive modeling and generating action step recommendations to eliminate or reduce impact of the probable consequences. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predicting probable activity consequences, the computer-implemented method comprising:
   collecting, by a computer, information from a plurality of data sources to identify various activities;
   detecting, by the computer, patterns of how any identified activity is linked with a corresponding event based on analyzing the collected information;
   indexing, by the computer, the patterns with data having a detected relationship to a particular event;
   extracting, by the computer, activity context information associated with a set of one or more identified activities corresponding to the particular event from the collected information;
   generating, by the computer, a cognitive model of how the set of one or more identified activities corresponding to the particular event are related to a set of activity consequences;
   predicting, by the computer, one or more probable activity consequences with degree of severity corresponding to the activity context information based on the generated cognitive model; and
   generating, by the computer, a recommendation to perform a set of one or more action steps to reduce impact of the probable activity consequences on one or more different aspects of the activity context information associated with the set of identified activities.

2. The computer-implemented method of claim 1 further comprising:
   automatically performing, by the computer, the set of one or more action steps to reduce the impact of the probable activity consequences on the one or more different aspects of the activity context information associated with the set of identified activities.

3. The computer-implemented method of claim 1, wherein the plurality of data sources includes one or more of news websites, corporate websites, social media websites, emails, text messages, electronic calendars, and sensors.

4. The computer-implemented method of claim 1, wherein the activity context information includes one or more of activity involved parties, activity importance, activity geographic location, activity location type, and activity timing.

5. The computer-implemented method of claim 1, wherein the computer generates the cognitive model using text mining and natural language processing.

6. The computer-implemented method of claim 1, wherein the computer is implemented in a robotic system.

7. The computer-implemented method of claim 6, wherein the robotic system collects the information from the plurality of data sources including local and remote sensors, analyzes the collected information to detect patterns in the collected information corresponding to an activity of the robotic system, predicts probable consequences of the activity with degree of severity based on the detected patterns, and automatically performs one or more steps to reduce impact of the probable consequences of the activity to increase performance of the robotic system.

8. A computer system for predicting probable activity consequences, the computer system comprising:
   a bus system;
   a storage device connected to the bus system, wherein the storage device stores program instructions; and
   a processor connected to the bus system, wherein the processor executes the program instructions to:
   collect information from a plurality of data sources to identify various activities;
   detect patterns of how any identified activity is linked with a corresponding event based on analyzing the collected information;
   index the patterns with data having a detected relationship to a particular event;
   extract activity context information associated with a set of one or more identified activities corresponding to the particular event from the collected information;
   generate a cognitive model of how the set of one or more identified activities corresponding to the particular event are related to a set of activity consequences;

predict one or more probable activity consequences with degree of severity corresponding to the activity context information based on the generated cognitive model; and generate a recommendation to perform a set of one or more action steps to reduce impact of the probable activity consequences on one or more different aspects of the activity context information associated with the set of identified activities.

9. The computer system of claim 8, wherein the processor further executes the program instructions to:

automatically perform the set of one or more action steps to reduce the impact of the probable activity consequences on the one or more different aspects of the activity context information associated with the set of identified activities.

10. The computer system of claim 8, wherein the plurality of data sources includes one or more of news websites, corporate websites, social media websites, emails, text messages, electronic calendars, and sensors.

11. The computer system of claim 8, wherein the activity context information includes one or more of activity involved parties, activity importance, activity geographic location, activity location type, and activity timing.

12. The computer system of claim 8, wherein the computer system generates the cognitive model using text mining and natural language processing.

13. The computer system of claim 8, wherein the computer system is implemented in a robotic system, and wherein the robotic system collects the information from the plurality of data sources including local and remote sensors, analyzes the collected information to detect patterns in the collected information corresponding to an activity of the robotic system, predicts probable consequences of the activity with degree of severity based on the detected patterns, and automatically performs one or more steps to reduce impact of the probable consequences of the activity to increase performance of the robotic system.

14. A computer program product for predicting probable activity consequences, the computer program product comprising a computer readable storage medium having program instructions embodied therewith, the program instructions executable by a computer to cause the computer to perform a method comprising:

collecting, by the computer, information from a plurality of data sources to identify various activities;

detecting, by the computer, patterns of how any identified activity is linked with a corresponding event based on analyzing the collected information;

indexing, by the computer, the patterns with data having a detected relationship to a particular event;

extracting, by the computer, activity context information associated with a set of one or more identified activities corresponding to the particular event from the collected information;

generating, by the computer, a cognitive model of how the set of one or more identified activities corresponding to the particular event are related to a set of activity consequences;

predicting, by the computer, one or more probable activity consequences with degree of severity corresponding to the activity context information based on the generated cognitive model; and generating, by the computer, a recommendation to perform a set of one or more action steps to reduce impact of the probable activity consequences on one or more different aspects of the activity context information associated with the set of identified activities.

15. The computer program product of claim 14 further comprising:

automatically performing, by the computer, the set of one or more action steps to reduce the impact of the probable activity consequences on the one or more different aspects of the activity context information associated with the set of identified activities.

16. The computer program product of claim 14, wherein the plurality of data sources includes one or more of news websites, corporate websites, social media websites, emails, text messages, electronic calendars, and sensors.

17. The computer program product of claim 14, wherein the activity context information includes one or more of activity involved parties, activity importance, activity geographic location, activity location type, and activity timing.

18. The computer program product of claim 14, wherein the computer generates the cognitive model using text mining and natural language processing.

19. The computer program product of claim 14, wherein the computer is implemented in a robotic system.

20. The computer program product of claim 19, wherein the robotic system collects the information from the plurality of data sources including local and remote sensors, analyzes the collected information to detect patterns in the collected information corresponding to an activity of the robotic system, predicts probable consequences of the activity with degree of severity based on the detected patterns, and automatically performs one or more steps to reduce impact of the probable consequences of the activity to increase performance of the robotic system.

* * * * *